(12) United States Patent
Takeda et al.

(10) Patent No.: US 10,710,587 B2
(45) Date of Patent: Jul. 14, 2020

(54) ELECTRCALLY-DRIVEN MINING VEHICLE AND BRAKE OPERATION GUIDING METHOD IN ELECTRICALLY-DRIVEN MINING VEHICLE

(71) Applicant: HITACHI CONSTRUCTION MACHINERY CO., LTD., Tokyo (JP)

(72) Inventors: Koei Takeda, Tsuchiura (JP); Shinichi Uotsu, Tsuchiura (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 139 days.

(21) Appl. No.: 16/081,040

(22) PCT Filed: Sep. 12, 2017

(86) PCT No.: PCT/JP2017/032928
§ 371 (c)(1),
(2) Date: Aug. 30, 2018

(87) PCT Pub. No.: WO2018/051990
PCT Pub. Date: Mar. 22, 2018

(65) Prior Publication Data
US 2019/0061763 A1    Feb. 28, 2019

(30) Foreign Application Priority Data
Sep. 14, 2016    (JP) ................. 2016-179845

(51) Int. Cl.
*B60W 20/14*    (2016.01)
*B60W 30/18*    (2012.01)
(Continued)

(52) U.S. Cl.
CPC ......... *B60W 30/18127* (2013.01); *B60K 6/46* (2013.01); *B60L 7/24* (2013.01);
(Continued)

(58) Field of Classification Search
CPC ... B60K 6/46; B60L 50/15; B60L 7/24; B60L 15/20; B60L 15/2009; B60L 2200/40;
(Continued)

(56) References Cited

U.S. PATENT DOCUMENTS

2016/0130788 A1* 5/2016 Nee .......................... E02F 9/26
                                                                    701/50
2016/0167519 A1* 6/2016 Luke ..................... B60W 30/09
                                                                    701/22

FOREIGN PATENT DOCUMENTS

JP    2007-223582 A    9/2007
JP    2015-153407 A    8/2015
(Continued)

OTHER PUBLICATIONS

International Search Report of PCT/JP2017/032928 dated Dec. 12, 2017.

*Primary Examiner* — Hunter B Lonsberry
*Assistant Examiner* — Matthew J. Reda
(74) *Attorney, Agent, or Firm* — Mattingly & Malur, PC

(57) ABSTRACT

An electrically-driven mining vehicle includes an obstacle detector, a speed detector, and an alarm. The alarm outputs a first warning, which urges an operator of the electrically-driven mining vehicle to operate a regenerative brake pedal that actuates only the regenerative brake device, and a second warning, which urges the operator to operate a cooperative brake pedal that uses the regenerative brake device and the mechanical brake device in combination. If the travel speed of the vehicle is included in a low speed range in which no difference can be considered to exist in distance between a first braking distance upon actuation of only the regenerative brake device and a second braking distance upon operation of a cooperative braking, a signal for performing the first warning is outputted earlier by at least a warning time interval.

4 Claims, 8 Drawing Sheets

(51) Int. Cl.
*G08G 1/16* (2006.01)
*B60T 8/17* (2006.01)
*B60L 15/20* (2006.01)
*B60L 7/24* (2006.01)
*B60T 8/172* (2006.01)
*B60W 20/00* (2016.01)
*B60W 10/18* (2012.01)
*B60T 1/10* (2006.01)
*B60L 50/15* (2019.01)
*B60K 6/46* (2007.10)
*B60W 30/095* (2012.01)
*B60W 50/14* (2020.01)

(52) U.S. Cl.
CPC ........... *B60L 15/2009* (2013.01); *B60L 50/15* (2019.02); *B60T 1/10* (2013.01); *B60T 8/17* (2013.01); *B60T 8/172* (2013.01); *B60W 10/18* (2013.01); *B60W 20/00* (2013.01); *B60W 20/14* (2016.01); *B60W 30/095* (2013.01); *G08G 1/16* (2013.01); *B60L 2200/40* (2013.01); *B60L 2240/423* (2013.01); *B60T 2270/604* (2013.01); *B60W 2050/146* (2013.01); *B60W 2520/10* (2013.01); *B60W 2554/00* (2020.02); *B60W 2710/18* (2013.01); *Y02T 10/6217* (2013.01); *Y02T 10/7077* (2013.01); *Y02T 10/7275* (2013.01)

(58) Field of Classification Search
CPC ................. B60L 2240/423; B60T 1/10; B60T 2270/604; B60T 8/17; B60T 8/172; B60W 10/18; B60W 2050/146; B60W 20/00; B60W 20/14; B60W 2520/10; B60W 2710/18; B60W 30/095; B60W 30/18127; B60W 2050/143; B60W 2550/10; B60W 2554/00; B60W 30/0956; G08G 1/16; G08G 1/166; Y02T 10/6217; Y02T 10/7077; Y02T 10/7275
See application file for complete search history.

(56) References Cited

FOREIGN PATENT DOCUMENTS

| | | |
|---|---|---|
| JP | 2015-225394 A | 12/2015 |
| JP | 2015-225541 A | 12/2015 |
| JP | 2016-022804 A | 2/2016 |

* cited by examiner

ELECTRCALLY-DRIVEN MINING VEHICLE AND BRAKE OPERATION GUIDING METHOD IN ELECTRICALLY-DRIVEN MINING VEHICLE

TECHNICAL FIELD

This invention relates to an electrically-driven mining vehicle and a brake operation guiding method in the electrically-driven mining vehicle.

BACKGROUND ART

As a technology that mounts a millimeter wave radar on a vehicle and performs automatic braking operation based on a distance to a front obstacle, Patent Document 1 discloses the following configuration: "When a predicted time to be required until the distance between an object and an own vehicle as derived based on a relative distance and a relative speed between the object and the own vehicle has decreased beyond a preset value, step-by-step braking control is performed by automatically and gradually increasing a braking force or a braked deceleration in a plurality of stages in time series. As a stage still earlier than the first one of the plurality of stages, for example, a caution stage in which the braking force or braked deceleration is still smaller than that in the first stage is included. In this caution stage, braking is performed using an auxiliary brake" (extracted from the Abstract).

PRIOR ART DOCUMENT

Patent Document

Patent Document 1: JP 2007-223582 A

DISCLOSURE OF THE INVENTION

Problem to be Solved by the Invention

On an electrically-driven dump truck that travels in a mine, a mechanical brake device for stopping a vehicle frame by a maximum braking force in the event of an emergency is mounted in addition to a regenerative brake device used in normally stopping the vehicle, and upon cooperative braking, the regenerative brake device and the mechanical brake device are instantaneously actuated to stop the vehicle. The operation timing of the cooperative braking is determined by the operator's choice. Here, there is a desire to refrain from unnecessarily operating the mechanical brake device as much as possible, because frequent use of the mechanical brake device causes wearing of brake pads.

On the other hand, the braking performances of the regenerative brake device and mechanical brake device are considerably different in a high-speed range, but are not different much in a low speed range. Concerning the selective use of the regenerative brake device and the mechanical brake device, there is a room for further contrivance by focusing on the difference in braking performances.

With the foregoing in view, the present invention has as the objective to provide a technology that decreases the frequency of use of a mechanical brake device in an electrically-driven mining vehicle with a regenerative brake device and the mechanical brake device mounted thereon.

Means for Solving the Problem

To achieve the above-described object, the electrically-driven mining vehicle according to the present invention is an electrically-driven mining vehicle with a regenerative brake device and a mechanical brake device mounted thereon, the electrically-driven mining vehicle including an obstacle detector that detects a relative distance from the electrically-driven mining vehicle to an obstacle forward in a traveling direction and a relative speed of the obstacle to the electrically-driven mining vehicle, a speed detector that detects a travel speed of the electrically-driven mining vehicle, an alarm that outputs a first warning, which urges an operator of the electrically-driven mining vehicle to operate a regenerative brake pedal that operates only the regenerative brake device, and a second warning, which urges the operator of the electrically-driven mining vehicle to operate a cooperative brake pedal that operates the regenerative brake device and the mechanical brake device in combination, and a vehicle control device that determines, based on detection results of the obstacle detector and speed detector, a possibility of a collision with the obstacle when only the regenerative brake device is actuated and a possibility of a collision with the obstacle when the cooperative braking is operated and performs output control of the first warning and second warning, and that is connected to each of the obstacle detector, speed detector and alarm, wherein the vehicle control device comprises a predicted collision time arithmetic operation section that divides the relative distance to the obstacle with the relative speed of the obstacle to perform arithmetic operation of a predicted collision time until the electrically-driven mining vehicle collides with the obstacle, a braking performance data storage section that stores correlated regenerative braking performance data of first braking distances as braking distances when only the regenerative brake device is actuated during travel of the electrically-driven mining vehicle and travel speeds of the electrically-driven mining vehicle upon measurement of the first braking distances, and correlated cooperative braking performance data of second braking distances as braking distances when the cooperative braking is operated during travel of the electrically-driven mining vehicle and travel speeds of the electrically-driven mining vehicle upon measurement of the second braking distances, and a warning determination section that extracts one of the first braking distances, which corresponds to the travel speed of the electrically-driven mining vehicle as acquired from the speed detector, from the regenerative braking performance data, calculates a first collision avoidance limit value based on a value obtained by dividing the extracted first braking distance with the travel speed of the electrically-driven mining vehicle as acquired from the speed detector, extracts one of the second braking distances, which corresponds to the travel speed of the electrically-driven mining vehicle as acquired from the speed detector, from the cooperative braking performance data, calculates a second collision avoidance limit value based on a value obtained by dividing the extracted second braking distance with the travel speed of the electrically-driven mining vehicle as acquired from the speed detector, and outputs a signal, which is for performing the first warning, and another signal, which is for performing the second warning, to the alarm based on results of comparisons of the predicted collision time with respective ones of the first collision avoidance limit value and second collision avoidance limit value, and, if the travel speed of the electrically-driven mining vehicle as acquired from the speed detector is equal to or smaller than a low speed threshold for determining a low speed range in which no difference can be considered to exist in distance between the extracted first braking distance and the extracted second braking distance, the warning determination section outputs the signal, which is for performing the first warning, at a timing earlier by at least a warning time interval, which has been determined by taking into consideration a time required for the operator to shift his or her foot from the regenerative brake pedal to the cooperative brake pedal, than the signal which is for performing the second warning.

Advantageous Effects of the Invention

According to the present invention, it is possible to provide a technology that decreases the frequency of use of a mechanical brake device in an electrically-driven mining vehicle with a regenerative brake device and the mechanical brake device mounted thereon. Problems, configurations and advantageous effects other than those described above will become apparent from the following description of embodiments.

MODES FOR CARRYING OUT THE INVENTION

Figure 1:
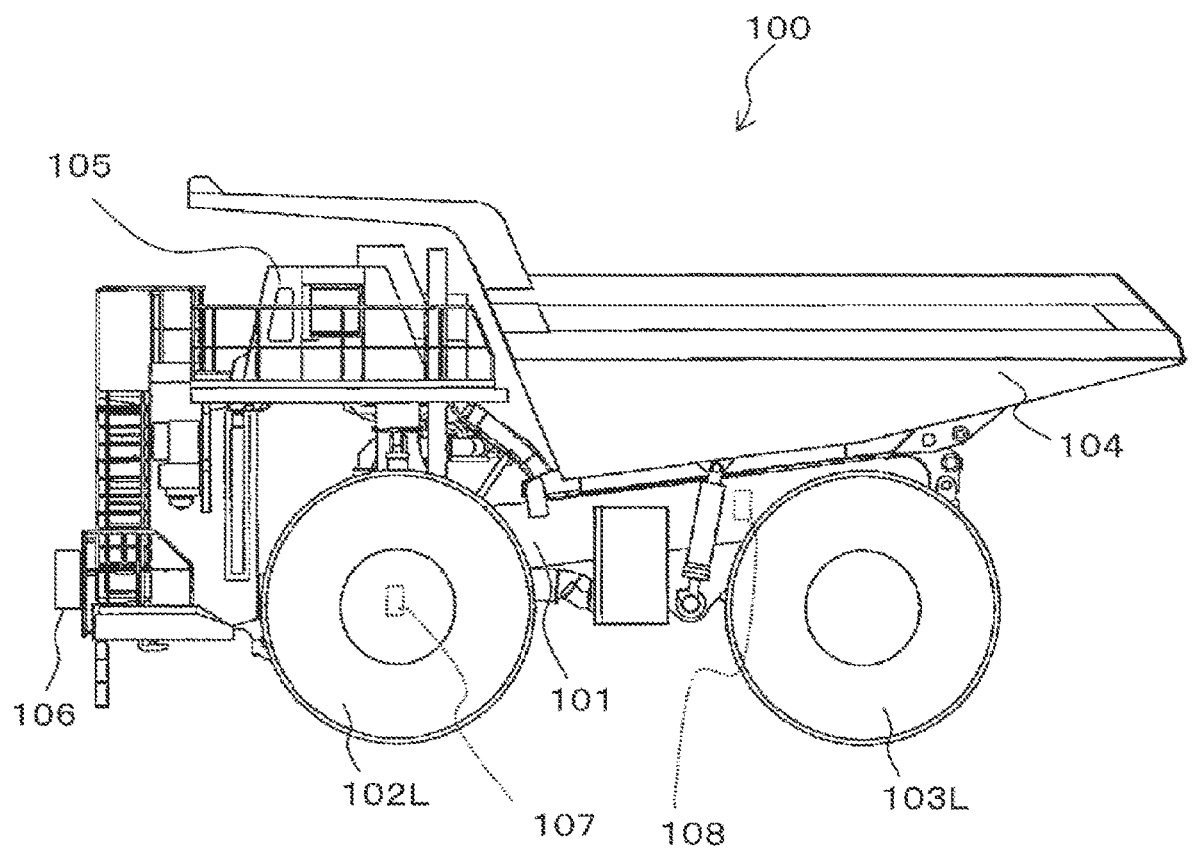
FIG. 1 is a side view of an electrically-driven mining vehicle according to a first embodiment.

Referring to the drawings, a description will hereinafter be made about embodiments of the present invention. Throughout all the figures, same elements are designated by same numerals or signs, and their repeated descriptions are omitted.

First Embodiment

Figure 2:
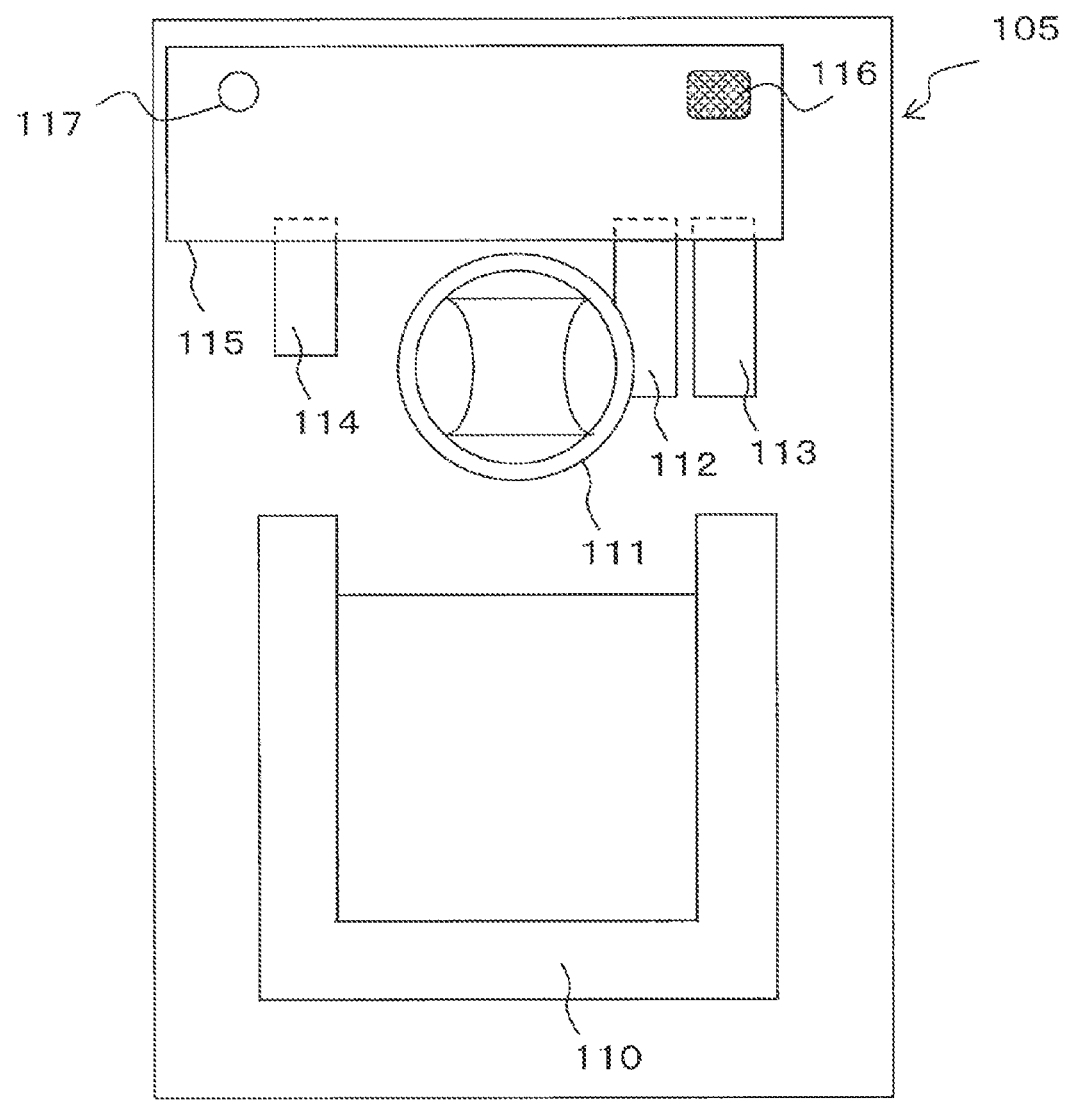
FIG. 2 is an explanatory diagram showing the interior of a cab of the electrically-driven mining vehicle.
Figure 3:
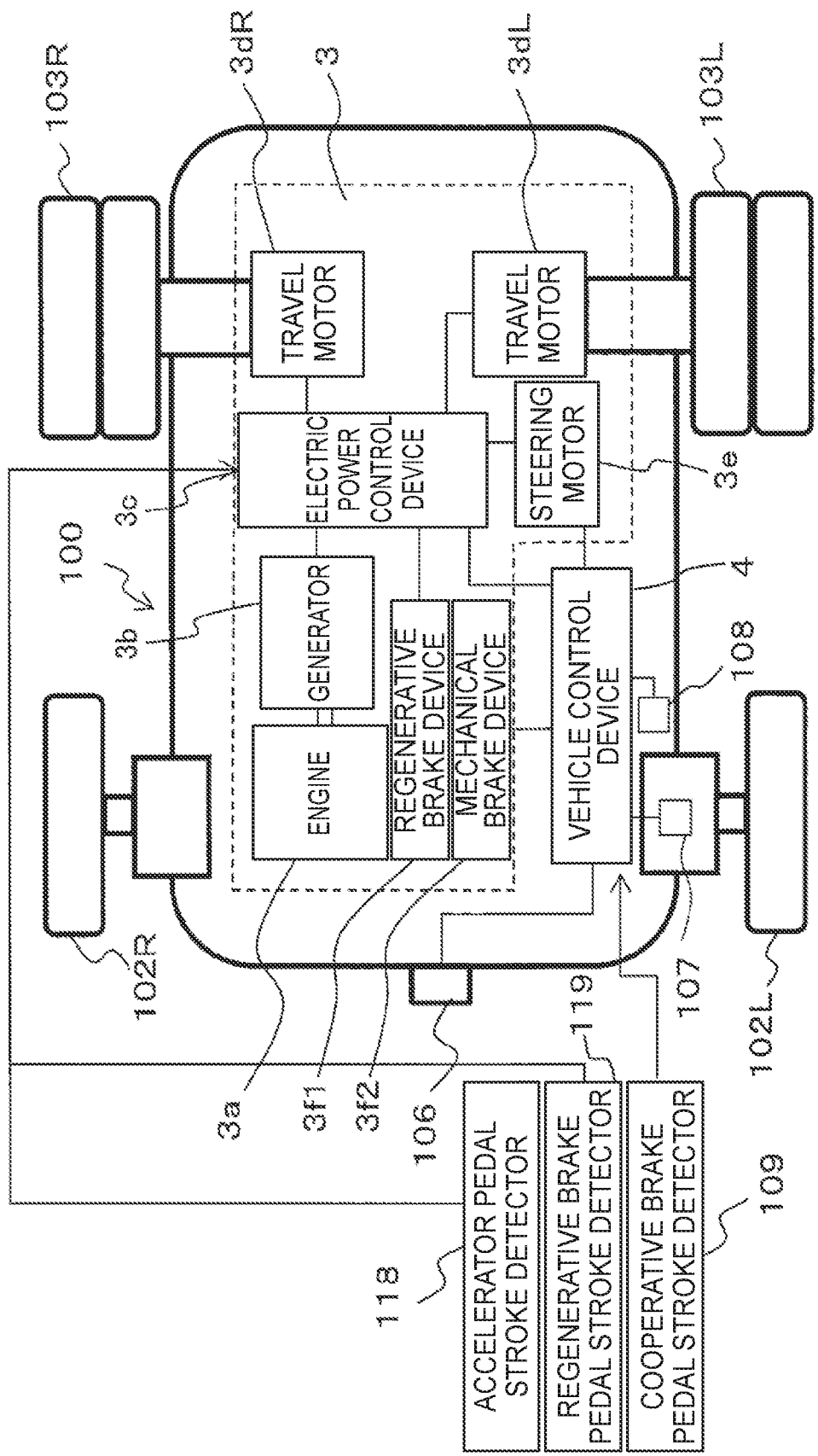
FIG. 3 is an overall configuration diagram of the electrically-driven mining vehicle.

In the first embodiment, the possibility of a collision is determined based on detection results of an obstacle, and a warning is triggered to urge operation of a regenerative brake pedal or a cooperative brake pedal. Based on FIGS. 1 to 3, a description will first be made about the configuration of an electrically-driven mining vehicle according to the first embodiment. FIG. 1 is a side view of the electrically-driven mining vehicle according to the first embodiment. FIG. 2 is an explanatory diagram showing the interior of a cab of the electrically-driven mining vehicle. FIG. 3 is an overall configuration diagram of the electrically-driven mining vehicle.

As shown in FIG. 1, the electrically-driven mining vehicle (which will hereinafter be described by taking "a dump truck" as an example) 100 includes a vehicle frame 101, a left front wheel 102L, a right front wheel 102R (see FIG. 3), a left rear wheel 103L, a right rear wheel 103R (see FIG. 3), and a vessel 104. The vessel 104 is a part in which an object to be hauled, such as earth or crushed rock, is loaded, and is raisably mounted on the vehicle frame 101.

Further, a cab 105 in which an operator rides is disposed on the vehicle frame 101 at a location above the left front wheel 102L.

At a front side of the vehicle frame 101, an obstacle detector 106 is arranged to detect an obstacle forward in a traveling direction. In this embodiment, millimeter wave radar is used as the obstacle detector 106. The millimeter wave radar outputs a millimeter wave, receives a reflection wave from the obstacle, and detects a relative distance $X_r$ from the dump truck 100 to the obstacle based on a time difference between the output and the reception and a relative speed $V_r$ of the obstacle based on the Doppler Effect.

On the vehicle frame 101, a payload weight detector 107 is also arranged to detect the weight of a payload in the vessel 104. The payload weight detector 107 may be configured as a sensor that detects the weight of the payload, for example, based on output values from pressure sensors (not shown) for suspensions connected to the left front wheel 102L, right front wheel 102R, left rear wheel 103L and right rear wheel 103R, respectively.

The dump truck 100 also includes a speed detector 108, which detects a rotational speed of the left front wheel 102L or right front wheel 102R as a driven wheel and detects a travel speed $V_1$ of the dump truck 100.

As shown in FIG. 2, in the cab 105, a seat 110 is disposed for allowing an operator to sit, and a steering wheel 111 is disposed in front of the seat 110. On a right side of a base of the steering wheel 111, a regenerative brake pedal 112 and an accelerator pedal 113 are arranged. On a left side of the base of the steering wheel 111, on the other hand, a cooperative brake pedal 114 is disposed.

The regenerative brake pedal 112 is for use upon normal braking, and is a pedal for actuating only a regenerative brake device 3/1.

The cooperative brake pedal 114 is for use upon emergency braking, and is a pedal for performing operation to decelerate and/or stop the vehicle while using a mechanical brake device 3/2 (see FIG. 3), which includes brake disks, and the regenerative brake device 3/1 (see FIG. 3) in combination.

In front of the steering wheel 111, a front panel 115 is disposed including instruments, a camera monitor that displays a captured image of surroundings of the dump truck 100, and so on. On a right side of an upper part in the front panel 115, a first alarm 116 (which is configured as a speaker in this embodiment) is disposed to notify operation of the regenerative brake pedal 112. On a left side of the upper part in the front panel 115, a second alarm 117 (which is configured as a warning light in this embodiment) is disposed to notify operation of the cooperative brake pedal 114.

In this embodiment, a first warning that urges the operator to operate the regenerative brake pedal 112 notifies using voice information, and a second warning that urges the operator to operate the cooperative brake pedal 114 is notified using visual information. However, the manner of notification is not limited to the above-described manner.

As illustrated in FIG. 3, the dump truck 100 includes a travel drive system 3 and a vehicle control device 4. The travel drive system 3 has an engine 3a, a generator 3b driven by the engine 3a, an electric power control device 3c to which electric power generated at the generator 3b is supplied, a travel motor 3dL for driving the left rear wheel 103L, and a travel motor 3dR for driving the right rear wheel 103R. The electric power to be supplied to the travel motors 3dL,3dR is controlled by the electric power control device 3c. In addition, the dump truck 100 also includes a cooperative brake pedal stroke detector 109, an accelerator pedal stroke detector 118, and a regenerative brake pedal stroke detector 119. The accelerator pedal stroke detector 118 and regenerative brake pedal stroke detector 119 are each connected to the electric power control device 3c.

The electric power control device 3c is connected to the vehicle control device 4, so that the vehicle control device 4 controls the electric power control device 3c. Via the electric power control device 3c, the vehicle control device 4 also controls drive of a steering motor 3e, and drive of brake devices for braking the dump truck 100. The brake devices include the regenerative brake device 3f1 and mechanical brake device 3f2.

The vehicle control device 4 is connected to each of the obstacle detector 106, payload weight detector 107, speed detector 108 and cooperative brake pedal stroke detector 109, and detection results of these detectors are inputted to the vehicle control device 4.

Figure 4:
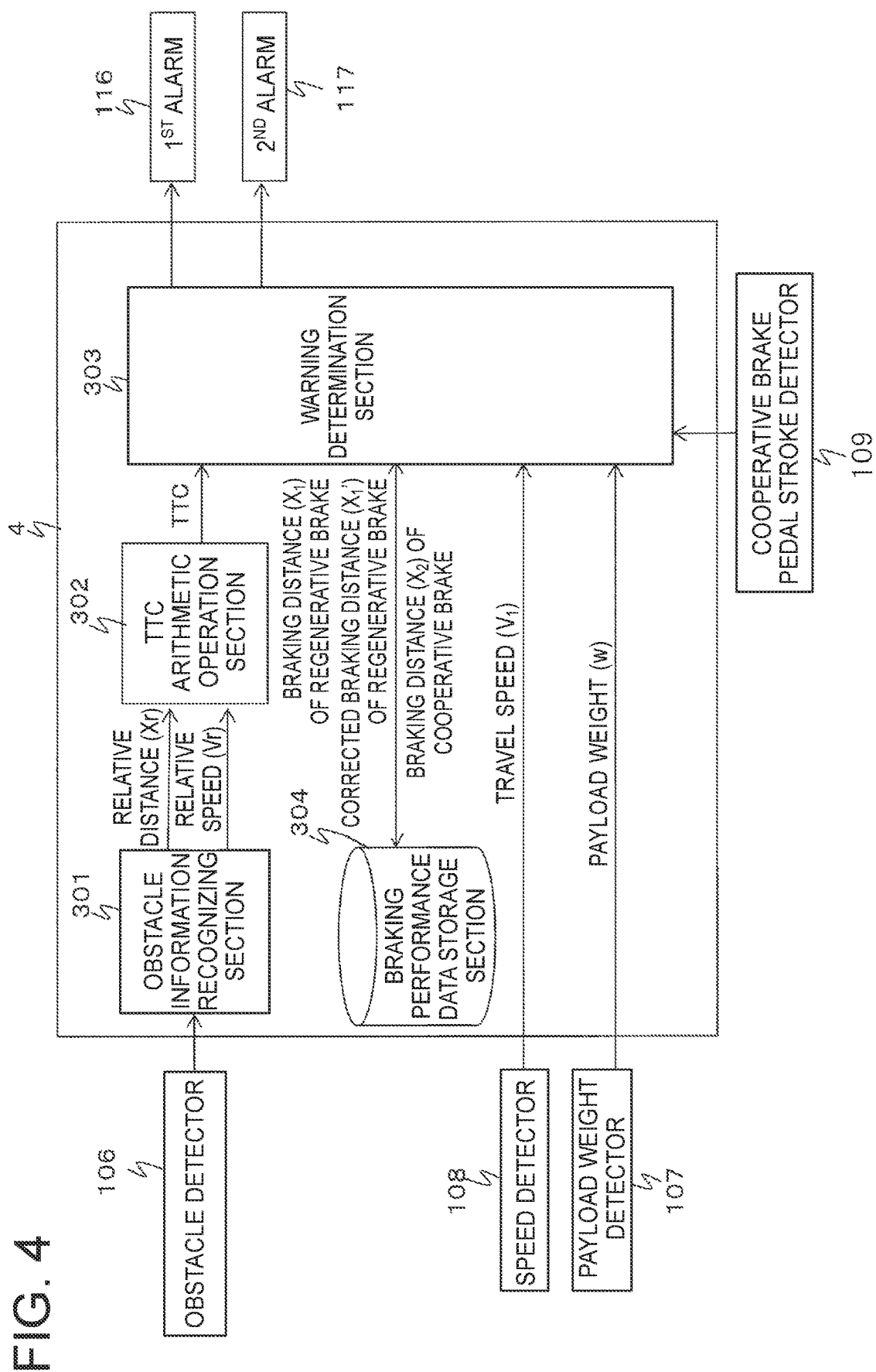
FIG. 4 is a block diagram illustrating the internal configuration of a vehicle control device.

Based on FIG. 4, a description will next be made about the functional configuration of the vehicle control device 4. FIG. 4 is a block diagram illustrating the internal configuration of the vehicle control device.

As illustrated in FIG. 4, the vehicle control device 4 includes an obstacle information recognizing section 301, a predicted collision time arithmetic operation section 302, a warning determination section 303, and a braking performance data storage section 304. As the above-described "predicted collision time" is also called "Time to Collision", "predicted collision time" will hereinafter be abbreviated as "TTC", and the predicted collision time arithmetic operation section 302 will also be referred to as the "TTC arithmetic operation section 302".

Connected to the vehicle control device 4 is the cooperative brake pedal stroke detector 109 that detects a stroke of the cooperative brake pedal 114, and the detection value is inputted to the warning determination section 303 and is used for the determination of performance or non-performance of an avoidance action.

Figure 5:
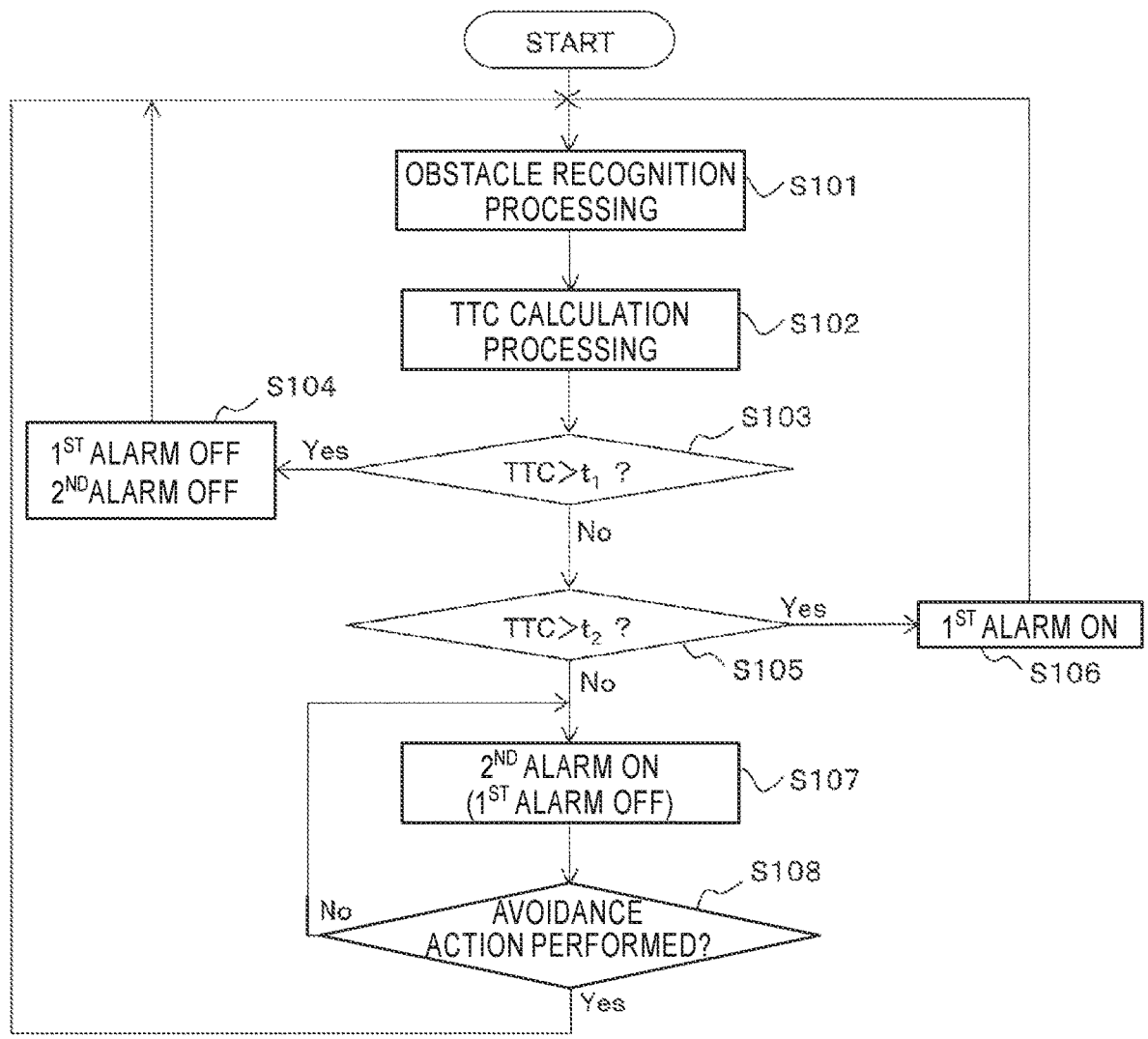
FIG. 5 is a flow chart illustrating a flow of processing in an operation guiding method according to the first embodiment.
Figure 6A:
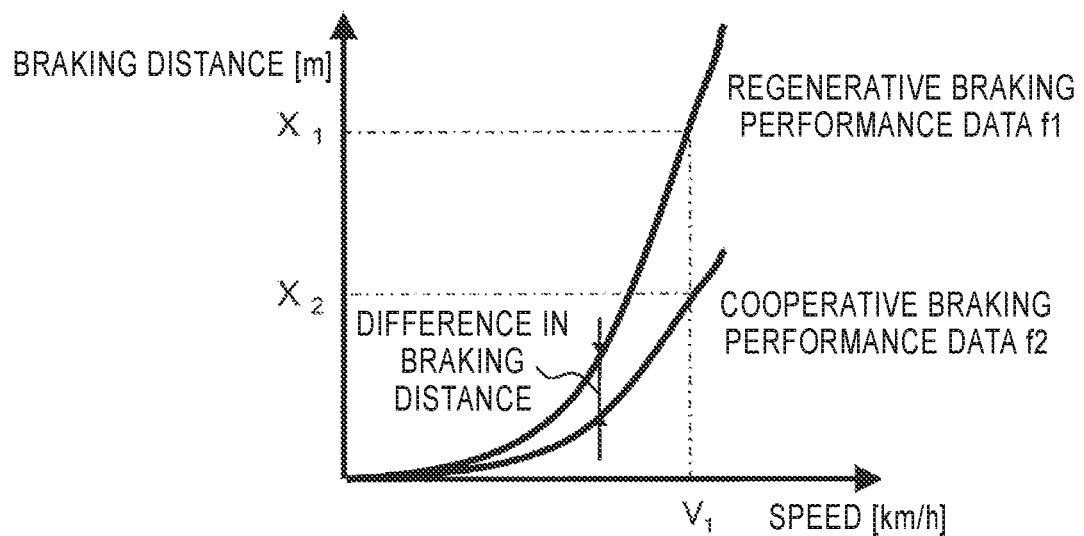
FIG. 6A is a diagram illustrating actual regenerative braking performance data and cooperative braking performance data.
Figure 6B:
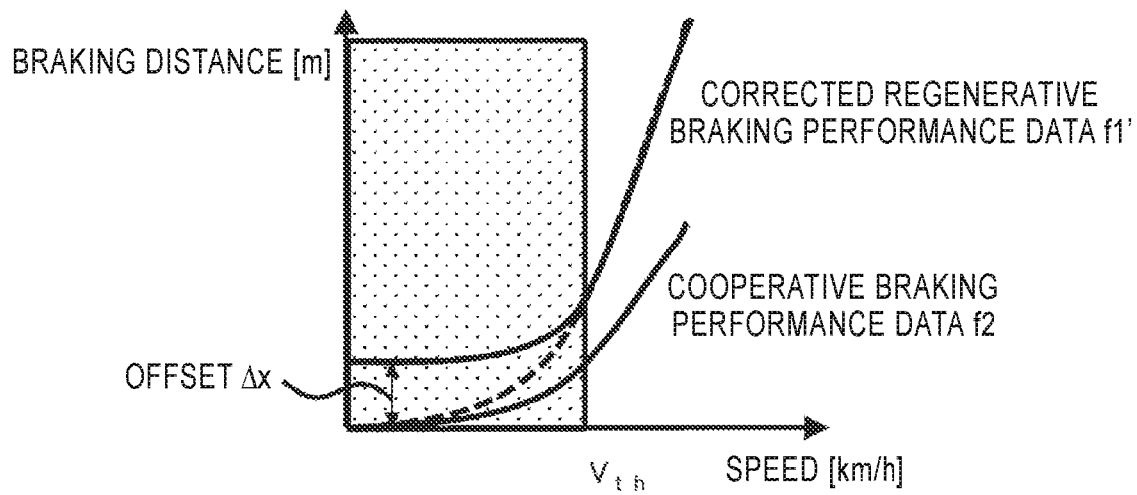
FIG. 6B is a diagram illustrating corrected regenerative braking performance data and cooperative braking performance data.

With reference to FIGS. 5, 6A and 6B, functions of the above-described respective configuration elements will be described along a flow of warning output processing. FIG. 5 is a flow chart illustrating a flow of processing in an operation guiding method according to the first embodiment. FIG. 6A is a diagram illustrating actual regenerative braking performance data and cooperative braking performance data. FIG. 6B is a diagram illustrating corrected regenerative braking performance data and cooperative braking performance data. A description will hereinafter be made in the order of steps in FIG. 5.

Using, as an input, information of the obstacle as outputted from the obstacle detector 106, the obstacle information recognizing section 301 performs arithmetic operation of the position of the obstacle (the relative distance $X_r$ to the dump truck 100; may include a direction in which the obstacle is viewed from the dump truck 100) and the relative distance $V_r$ between the obstacle and the dump truck 100, and outputs them (S101).

Using, as inputs, the relative distance $X_r$ to the obstacle and the relative speed $V_r$ between the obstacle and the dump truck 100, the TTC arithmetic operation section 302 performs arithmetic operation of TTC (S102). Using the relative distance $X_r$ and relative speed $V_r$ between the dump truck 100 and the obstacle, TTC is expressed by the following formula (1):

$$TTC = \frac{Xr}{Vr} \quad (1)$$

The TTC arithmetic operation section 302 outputs the arithmetically-operated TTC to the warning determination section 303. For the sake of convenience of description, a description will hereinafter be made under the assumption that the actual speed of the obstacle is zero (0) and the relative speed $V_r$ and the travel speed $V_1$ of the dump truck 100 coincide with each other ($V_r=V_1$).

Based on TTC outputted from the TTC arithmetic operation section 302, the travel speed $V_1$ of the dump truck 100 as outputted from the speed detector 108 and the braking performance data stored in the braking performance data storage section 304, the warning determination section 303 determines the degree of collision risk between the dump truck 100 and the obstacle (S103). The braking performance data represent correlated brake performance of travel speeds and braking distances.

The warning determination section 303 acquires the current travel speed $V_1$ of the dump truck 100 from the speed detector 108. By checking the travel speed $V_1$ against regenerative braking performance data f1 stored in the braking performance data storage section 304, the warning determination section 303 extracts a first braking distance $X_1$ which is a braking distance when the regenerative brake device 3f1 is actuated while traveling at the travel speed $V_1$. Based on the following formula (2), the warning determination section 303 then adds a margin $m_1$ to a value, which has been obtained by dividing the first braking distance $X_1$ by the regenerative brake device 3f1 with the travel speed $V_1$ of the dump truck 100, to determine a first collision avoidance limit value $t_1$ as a collision avoidance limit value upon actuation of the regenerative brake device 3f1.

$$t_1 = \frac{X1}{V1} + m1 \quad (2)$$

The margin $m_1$ is a value set by taking into consideration a reaction time (free running time) from hearing of a warning by the operator until performance of braking operation by the operator, and may be set at 1 to 3 seconds or so. The margin $m_1$ may be dynamically changed with the travel speed $V_1$, because the braking distance from depression of the brake pedal until stopping becomes longer if the travel speed $V_1$ of the dump truck 100 is large.

The warning determination section 303 compares the first collision avoidance limit value $t_1$ and TTC. If TTC is greater than the first collision avoidance limit value $t_1$ (S103/Yes), neither notification by the first alarm 116 nor notification by the second alarm 117 are performed (S104) because there is no risk of a collision even if the regenerative brake pedal 112 is not depressed. Subsequently, the processing returns to step S101, and obstacle recognition processing is repeated.

If TTC outputted from the TTC arithmetic operation section 302 is equal to or smaller than the first collision avoidance limit value $t_1$ (S103/No), the warning determination section 303 performs a comparison between TTC outputted from the TTC arithmetic operation section 302 and a second collision avoidance limit value $t_2$ which is for determining whether notification is performed to urge operation of the cooperative brake pedal 114 (S105). Referring to cooperative braking performance data f2 stored in the braking performance data storage section 304, the warning determination section 303 extracts a second braking distance $X_2$ which is a braking distance when the cooperative braking is operated while traveling at the travel speed $V_1$. Based on the following formula (3), the warning determination section 303 then adds the margin $m_1$ to a value, which has been obtained by dividing the second braking distance $X_2$ by the cooperative braking with the travel speed $V_1$ of the dump truck 100, to determine the second collision avoidance limit value $t_2$ as a collision avoidance limit value upon operation of the cooperative braking.

$$t_2 = \frac{X2}{V1} + m1 \quad (3)$$

The margin $m_1$ is a value set by taking into consideration a reaction time (free running time) from hearing of a warning by the operator until performance of braking operation by the operator, and may be set at 1 to 3 seconds or so. If TTC outputted from the TTC arithmetic operation section 302 is greater than the second collision avoidance limit value $t_2$ (S105/Yes), operation of the cooperative brake pedal 114 is not needed, but there is a risk of collision if the regenerative brake device 3/1 is not actuated. Therefore, a signal which is for causing the first alarm 116 to output a warning is generated and outputted, whereby triggering of a warning is performed (S106).

If TTC is equal to or smaller than the second collision avoidance limit value $t_2$ (S105/No), it is determined that there is a risk of collision if the cooperative braking is not actuated. Therefore, a signal which is for causing the second alarm 117 to output a warning is generated and outputted, whereby triggering of a warning is performed (S107).

After the actuation of the first alarm 116 (S106), the processing returns to step 101, and the processing of the obstacle recognition processing and its subsequent processing is repeated. If the operator actuates the regenerative brake device 3/1 and the risk of collision no longer exists (if TTC has increased greater than the first collision avoidance limit value $t_1$), the first alarm 116 is turned off in step S104.

After the actuation of the second alarm 117 (S107), the warning determination section 303 determines the performance or non-performance of an avoidance action by the operator based on the detection value of a cooperative brake pedal stroke from the cooperative brake pedal stroke detector 109 that detects an operation quantity (depression stroke) of the cooperative brake pedal 114 (S108). If the operator receives notification from the second alarm 117 and performs operation of the cooperative brake pedal 114, in other words, if the detection value of the cooperative brake pedal stroke is inputted in the warning determination section 303, the warning determination section 303 determines that an avoidance action has been performed (S108/Yes), and the processing returns to step S101. If the processing of the obstacle recognition processing and its subsequent processing is then repeated and a collision has been avoided (S103/Yes) the actuation of the second alarm 117 is turned off (S104).

If there is no input of the detection value of a cooperative brake pedal stroke (S108/No), on the other hand, the warning determination section 303 determines that no avoidance action has been performed (S108/No), and the processing then returns to step S107 to keep the second alarm 117 actuated continuously.

The processing of FIG. 5 may be configured so that the processing is started concurrently with a start of the engine and, when stop operation of the engine 3a, for example, turn-off operation of an engine key is performed, a command to end the processing is transmitted to the vehicle control device 4 by using the operation as a trigger, and an action is then performed to end the processing. The ending action of the processing may be configured so that it is performed upon acquisition of a command by the vehicle control device 4 no matter in which one of the step S101 to the step 108 the processing is under way.

Now referring to FIGS. 6A and 6B, a description will be made about the difference in braking performance between the regenerative brake and the cooperative braking. As illustrated in FIG. 6A, the braking distances of the regenerative brake and mechanical brake are considerably different in a high-speed range, but are not different much in a low speed range. There is no much difference in the low speed range between the two types of braking performances. If a warning is outputted by determining the risk of collision based on their respective braking performances, it is hence conceivable that a second-stage warning, which urges the use of the cooperative braking, sounds (S107) shortly after sounding of a first-stage warning which urges the use of the regenerative brake (shortly after S106). In the case of automatic brake control, a situation may also arise that the processing has to be shifted to the control of the cooperative braking soon after braking by the regenerative brake.

Therefore, in the low speed range that the difference between the regenerative braking performance and the cooperative braking performance (the difference in braking distance) decreases to equal to or smaller than a predetermined threshold, arithmetic operation is performed using corrected regenerative braking performance data f1' added with an offset Δx from the inherent braking performance of the regenerative brake as illustrated in FIG. 6B. The offset Δx as used herein may desirably be set so that the difference in time between a warning timing arithmetically operated based on the corrected regenerative braking data f1' and a warning timing arithmetically operated based on the braking performance data of the cooperative braking becomes longer than a time until which the operator, who has operated the regenerative brake pedal 112 after triggering of at least the first alarm 116, takes an action to shift his or her foot to the cooperative brake pedal 114 according to the second alarm 117 to be triggered subsequently.

The above-described term "low speed range" means speeds that range from speed zero (0) to a low speed threshold $V_{th}$. This low speed threshold $V_{th}$ separates the low speed range and a high speed range from each other, and is set as a speed, which allows operation of the cooperative braking, based on the difference in braking performance between the regenerative brake and the cooperative braking. The low speed threshold $V_{th}$ has a significance as a low speed threshold for determining a low speed range in which no difference can be considered to exist in distance between the first braking distance $X_1$, which is a braking distance upon actuation of the regenerative brake device 3/1, and the second braking distance $X_2$, which is a braking distance upon operation of the cooperative braking.

Therefore, the first braking distance $X_1$ by the regenerative brake, which is used upon arithmetic operation of the first collision avoidance limit value $t_1$ when the regenerative brake is actuated in step S103 as described above, changes to a post-correction first braking distance $(X_1+\Delta x)$. As a consequence, a post-correction first collision avoidance limit value $t_1'$ that uses the corrected regenerative braking performance data f1' is expressed by the following formula (4):

$$t_1' = \frac{X1 + \Delta x}{V1} + m1 \quad (4)$$

$t_1'>t_1$, because $\Delta x>0$. Therefore, the determination of "TTC>$t_1'$?" in step S103 results in negative at an earlier timing than the case of the comparison with the pre-correction first collision avoidance limit value $t_1$, so that the first alarm 116 triggers a warning at an earlier timing (S106). As the cooperative braking performance data f2 have no offset, the triggering timing of a warning from the second alarm 117 in step S107 is arithmetically operated using the second braking distance $X_2$ of the actual cooperative braking. As a result, an interval of $(t_2-t_1')$ arises between the timing of the warning from the first alarm 116 through step 106 and the timing of the warning from the second alarm 117 through step S107. This $(t_2-t_1')$ corresponds to a warning time interval.

Owing to the interval described above, it is possible to perform the triggering of both warnings for the avoidance of a collision while preventing them from being triggered at successive timings. This prevention of triggering of both warnings at successive timings enables to stop the vehicle by only the regenerative brake device 3/1 based on the operation of the regenerative brake pedal 112 by the operator after the triggering of the first alarm 116. As a consequence, it is possible to suppress the wearing of brake pads by decreasing the frequency of operation of the cooperative brake pedal 114.

Second Embodiment

Figure 7:
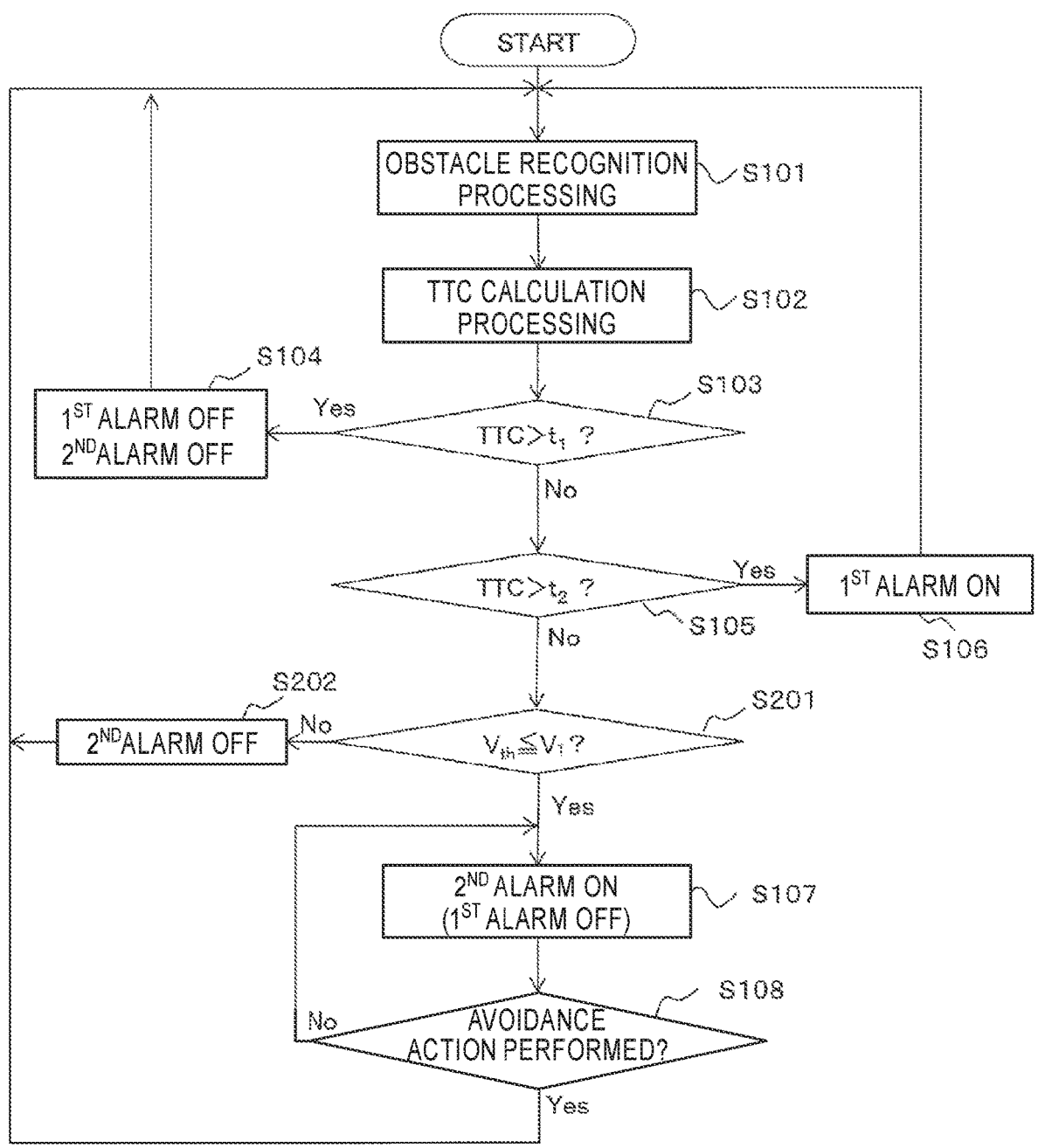
FIG. 7 is a flow chart illustrating a flow of processing in an operation guiding method according to a second embodiment.
Figure 8:
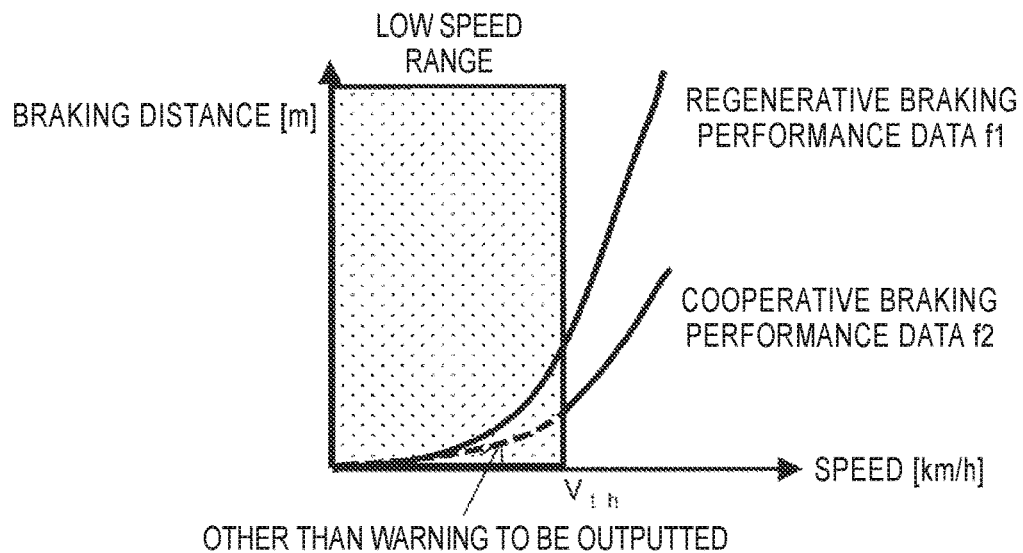
FIG. 8 is a diagram illustrating braking performance data of a cooperative braking in a low speed range.

Referring to FIGS. 7 and 8, a description will be made about a second embodiment. The second embodiment avoids an output of a warning, which urges operation of the cooperative brake pedal 114, in succession with a warning, which urges operation of the regenerative brake pedal 112, by outputting no warning to urge operation of the cooperative brake pedal 114 in a low speed range. FIG. 7 is a flow chart illustrating a flow of processing in an operation guiding method according to the second embodiment. FIG. 8 is a diagram illustrating braking performance data of the cooperative braking in the low speed range. A description will hereinafter be made in the order of steps in FIG. 7. Similar processing as in the first embodiment is identified by similar step numbers, and an overlapping description will be omitted.

If TTC is determined to be greater than the second collision avoidance limit value $t_2$ in step S105 (S105/No), the warning determination section 303 performs a comparison between the travel velocity $V_1$ of the dump truck 100 and the low speed threshold $V_{th}$ (S201).

If the travel speed $V_1$ of the dump truck 100 is smaller than the low speed threshold $V_{th}$ (S201/No), the travel velocity $V_1$ of the dump truck 100 is in the low speed range so that the warning determination section 303 turns off the second alarm 117 as illustrated in FIG. 7 and determines the obstacle to be other than those which require an output of a warning that urges the operator to operate the cooperative braking (S202).

If the travel speed $V_1$ of the dump truck 100 is equal to or greater than the low speed threshold $V_{th}$ (S201/Yes), the second alarm 117 is turned on to output a warning that urges operation of the cooperative brake pedal 114 (S107).

According to this embodiment, only a first warning is outputted to urge operation of the regenerative brake device 3/1 when there is no much difference in braking performance between the regenerative brake device 3/1 and the cooperative braking. As a consequence, a second warning that urges operation of the cooperative brake pedal 114 is no longer triggered in a low speed range in succession with the first warning that urges operation of the regenerative brake pedal 112, and therefore the vehicle can be stopped by the regenerative brake device 3/1 only. As a result, it is possible to decrease the frequency of operation of the cooperative braking and hence to suppress the wearing of brake pads.

The above-described embodiments are merely illustrative for describing the present invention, and are not intended to restrict the scope of the present invention to the embodiments described above. Those skilled in the art can practice the present invention in various other modes within a range not departing from the spirit of the present invention.

For example, the present invention can be applied to electrically-driven vehicles for mines such as excavators, wheel loaders, sprinkler trucks and graders, all of which perform work in mines. In other words, the present invention can be widely used in vehicles with a plurality of brake devices of different braking forces mounted thereon.

Figure 9:
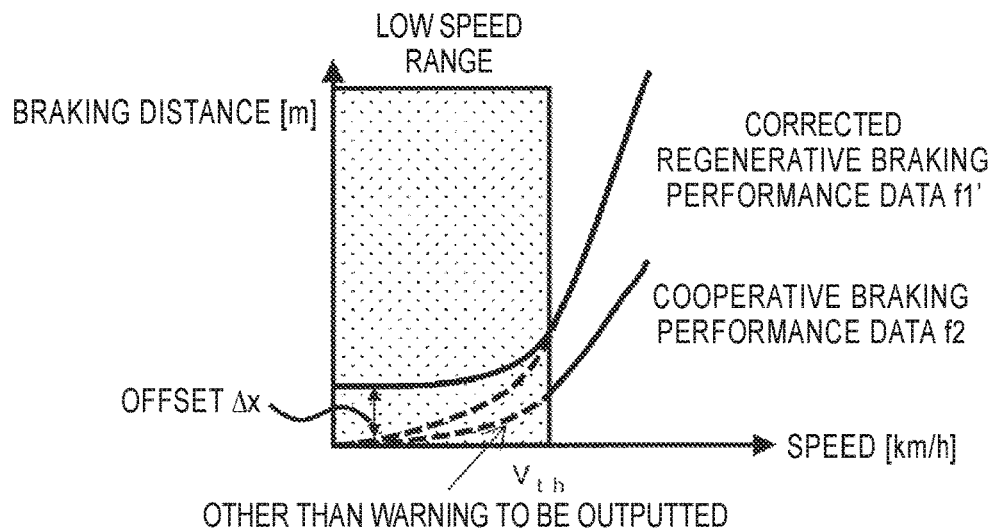
FIG. 9 is a diagram illustrating post-correction braking performance data of a regenerative brake and braking performance data of a cooperative braking in a low speed range according to a further embodiment.

In addition, the first embodiment and the second embodiment may be practiced in combination. As illustrated in FIG. 9, for example, the corrected regenerative braking performance data f1' in the first embodiment are used in a low speed range to perform arithmetic operation of the output timing of a warning that urges operation of the regenerative brake. Further, as in the second embodiment, no determination of a risk is performed from the braking performance of the cooperative braking in the low speed range. Described specifically, in the low speed range, a first timing is set earlier and only a first warning is outputted without performing any risk determination with respect to the regenerative brake. In this manner, it is possible to avoid triggering of the two kinds of warnings in succession and also to reduce an inertial force to be applied to an operator by a deceleration.

As a further embodiment, the output timing can be divided into a plurality of output timings although with respect to the two types of brakes in the above-described embodiments, only a single timing is calculated and outputted for each type of brake. For example, the output timing of a warning for urging the operation of the regenerative brake device 3/1 to avoid the risk of a collision can be divided into twice.

Figure 10:
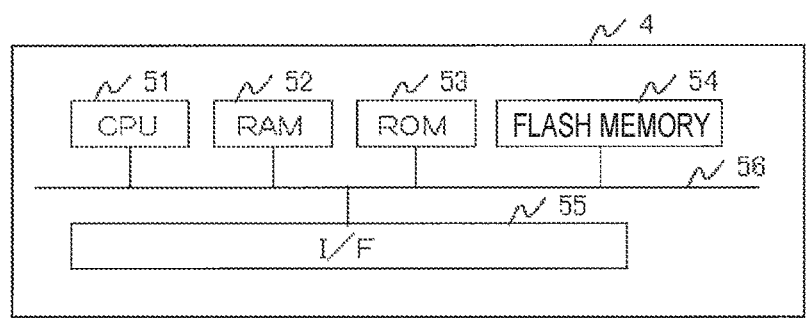
FIG. 10 is a hardware configuration diagram of another vehicle control device.

The hardware of the above-described vehicle control device 4 may be configured as illustrated in FIG. 10, including CPU 51, RAM 52, ROM 53, flash memory 54, I/F 55 and a bus 56. These CPU 51, RAM 52, ROM 53, flash memory 54 and I/F 55 may be configured to be connected together via the bus 56. The vehicle control device 4 may be configured through execution of software, which realizes the above-described individual processing and the function blocks illustrated in FIG. 3, by the hardware illustrated in FIG. 10. As a different configuration example of the vehicle control device 4, the vehicle control device 4 may be configured using an integrated circuit that realizes the function blocks illustrated in FIG. 3.

LEGENDS

100: Electrically-driven mining vehicle
101: vehicle frame
116: First alarm
117: Second alarm

The invention claimed is:

1. An electrically-driven mining vehicle with a regenerative brake device and a mechanical brake device mounted thereon, the electrically-driven mining vehicle including:
   an obstacle detector that detects a relative distance from the electrically-driven mining vehicle to an obstacle forward in a traveling direction and a relative speed of the obstacle to the electrically-driven mining vehicle,
   a speed detector that detects a travel speed of the electrically-driven mining vehicle,
   an alarm that outputs a first warning, which urges an operator of the electrically-driven mining vehicle to operate a regenerative brake pedal that operates only the regenerative brake device, and a second warning, which urges the operator of the electrically-driven mining vehicle to operate a cooperative brake pedal that operates a cooperative braking using the regenerative brake device and the mechanical brake device in combination, and
   a vehicle control device that determines, based on detection results of the obstacle detector and speed detector, a possibility of a collision with the obstacle when only the regenerative brake device is actuated and a possibility of a collision with the obstacle when the cooperative braking is operated and performs output control of the first warning and second warning, and that is connected to each of the obstacle detector, speed detector and alarm, wherein:
   the vehicle control device comprises:
   a predicted collision time arithmetic operation section that divides the relative distance to the obstacle with the relative speed of the obstacle to perform arithmetic operation of a predicted collision time until the electrically-driven mining vehicle collides with the obstacle,
   a braking performance data storage section that stores correlated regenerative braking performance data of first braking distances as braking distances when only the regenerative brake device is actuated during travel of the electrically-driven mining vehicle and travel speeds of the electrically-driven mining vehicle upon measurement of the first braking distances, and correlated cooperative braking performance data of second braking distances as braking distances when the cooperative braking is operated during travel of the electrically-driven mining vehicle and travel speeds of the electrically-driven mining vehicle upon measurement of the second braking distances, and
   a warning determination section that extracts one of the first braking distances, which corresponds to the travel speed of the electrically-driven mining vehicle as acquired from the speed detector, from the regenerative braking performance data, calculates a first collision avoidance limit value based on a value obtained by dividing the extracted first braking distance with the travel speed of the electrically-driven mining vehicle as acquired from the speed detector, extracts one of the second braking distances, which corresponds to the travel speed of the electrically-driven mining vehicle as acquired from the speed detector, from the cooperative braking performance data, calculates a second collision avoidance limit value based on a value obtained by dividing the extracted second braking distance with the travel speed of the electrically-driven mining vehicle as acquired from the speed detector, and outputs a signal, which is for performing the first warning, and another signal, which is for performing the second warning, to the alarm based on results of comparisons of the predicted collision time with respective ones of the first collision avoidance limit value and second collision avoidance limit value; and
   if the travel speed of the electrically-driven mining vehicle as acquired from the speed detector is equal to or smaller than a low speed threshold for determining a low speed range in which no difference can be considered to exist in distance between the extracted first braking distance and the extracted second braking distance, the warning determination section outputs the signal, which is for performing the first warning, at a timing earlier by at least a warning time interval, which has been determined by taking into consideration a time required for the operator to shift his or her foot from the regenerative brake pedal to the cooperative brake pedal, than the signal which is for performing the second warning.

2. The electrically-driven mining vehicle according to claim 1, wherein:
   the warning determination section uses corrected regenerative braking performance data added with an offset to ensure inclusion of the warning time interval in the regenerative braking performance data at the low speed threshold value and smaller, and extracts the first braking distance, which corresponds to the travel speed of the electrically-driven mining vehicle as acquired from the speed detector, from the corrected regenerative braking performance data.

3. An electrically-driven mining vehicle with a regenerative brake device and a mechanical brake device mounted thereon, the electrically-driven mining vehicle including:
   an obstacle detector that detects a relative distance from the electrically-driven mining vehicle to an obstacle forward in a traveling direction and a relative speed of the obstacle to the electrically-driven mining vehicle,
   a speed detector that detects a travel speed of the electrically-driven mining vehicle,
   an alarm that outputs a first warning, which urges an operator of the electrically-driven mining vehicle to operate a regenerative brake pedal that operates only the regenerative brake device, and a second warning, which urges the operator of the electrically-driven mining vehicle to operate a cooperative brake pedal that operates a cooperative braking using the regenerative brake device and the mechanical brake device in combination, and
   a vehicle control device that determines, based on detection results of the obstacle detector and speed detector, a possibility of a collision with the obstacle when only the regenerative brake device is actuated and a possibility of a collision with the obstacle when the cooperative braking is operated and performs output control of the first warning and second warning, and that is connected to each of the obstacle detector, speed detector and alarm, wherein:

the vehicle control device comprises:

a predicted collision time arithmetic operation section that divides the relative distance to the obstacle with the relative speed of the obstacle to perform arithmetic operation of a predicted collision time until the electrically-driven mining vehicle collides with the obstacle, a braking performance data storage section that stores correlated regenerative braking performance data of first braking distances as braking distances when only the regenerative brake device is actuated during travel of the electrically-driven mining vehicle and travel speeds of the electrically-driven mining vehicle upon measurement of the first braking distances, and correlated cooperative braking performance data of second braking distances as braking distances when the cooperative braking is operated during travel of the electrically-driven mining vehicle and travel speeds of the electrically-driven mining vehicle upon measurement of the second braking distances, and a warning determination section that extracts one of the first braking distances, which corresponds to the travel speed of the electrically-driven mining vehicle as acquired from the speed detector, from the regenerative braking performance data, calculates a first collision avoidance limit value based on a value obtained by dividing the extracted first braking distance with the travel speed of the electrically-driven mining vehicle as acquired from the speed detector, extracts one of the second braking distances, which corresponds to the travel speed of the electrically-driven mining vehicle as acquired from the speed detector, from the cooperative braking performance data, calculates a second collision avoidance limit value based on a value obtained by dividing the extracted second braking distance with the travel speed of the electrically-driven mining vehicle as acquired from the speed detector, and outputs a signal, which is for performing the first warning, and another signal, which is for performing the second warning, to the alarm based on results of comparisons of the predicted collision time with respective ones of the first collision avoidance limit value and second collision avoidance limit value; and if the travel speed of the electrically-driven mining vehicle as acquired from the speed detector is equal to or smaller than a low speed threshold for determining a low speed range in which no difference can be considered to exist in distance between the extracted first braking distance and the extracted second braking distance, the warning determination section, at the low speed threshold or smaller, outputs only the signal, which is for performing the first warning but does not output the signal which is for performing the second warning.

4. A brake operation guiding method in an electrically-driven mining vehicle mounted with:

a regenerative brake device and a mechanical brake device, an obstacle detector that detects a relative distance from the electrically-driven mining vehicle with the regenerative brake device and mechanical brake device mounted thereon to an obstacle forward in a traveling direction and a relative speed of the obstacle to the electrically-driven mining vehicle, a speed detector that detects a travel speed of the electrically-driven mining vehicle, an alarm that outputs a first warning, which urges an operator of the electrically-driven mining vehicle to operate an regenerative brake pedal that operates only the regenerative brake device, and a second warning, which urges the operator of the electrically-driven mining vehicle to operate a cooperative braking that uses the regenerative brake device and the mechanical brake device in combination, and a vehicle control device that determines, based on detection results of the obstacle detector and speed detector, a possibility of a collision with the obstacle when only the regenerative brake device is actuated and a possibility of a collision with the obstacle when the cooperative braking is operated and performs output control of the first warning and second warning, and that is connected to each of the obstacle detector, speed detector and alarm, which comprises:

a step of performing, based on the relative distance and relative speed acquired from the obstacle detector, arithmetic operation of a predicted collision time until the electrically-driven mining vehicle collides with the obstacle; and another step of referring to correlated regenerative braking performance data of first braking distances as braking distances when only the regenerative brake device is actuated during travel of the electrically-driven mining vehicle and travel speeds of the electrically-driven mining vehicle upon measurement of the first braking distances, and correlated cooperative braking performance data of second braking distances as braking distances when the cooperative braking is operated during travel of the electrically-driven mining vehicle and travel speeds of the electrically-driven mining vehicle upon measurement of the second braking distances, extracting one of the first braking distances, which corresponds to the travel speed of the electrically-driven mining vehicle as acquired from the speed detector, from the regenerative braking performance data, calculating a first collision avoidance limit value based on a value obtained by dividing the extracted first braking distance with the travel speed of the electrically-driven mining vehicle as acquired from the speed detector, extracting one of the second braking distances, which corresponds to the travel speed of the electrically-driven mining vehicle as acquired from the speed detector, from the cooperative braking performance data, calculating a second collision avoidance limit value based on a value obtained by dividing the extracted second braking distance with the travel speed of the electrically-driven mining vehicle as acquired from the speed detector, and outputting a signal, which is for performing the first warning, and another signal, which is for per forming the second warning, to the alarm based on results of comparisons of the predicted collision time with respective ones of the first collision avoidance limit value and second collision avoidance limit value, and, if the travel speed of the electrically-driven mining vehicle as acquired from the speed detector is equal to or smaller than a low speed threshold for determining a low speed range in which no difference can be considered to exist in distance between the extracted first braking distance and the extracted second braking distance, outputting the signal, which is for performing the first warning, at a timing earlier by at least a warning time interval, which has been determined by taking into consideration a time required for the operator to shift his or her foot from the regenerative brake pedal to the cooperative brake pedal, than the signal which is for performing the second warning.

\* \* \* \* \*